US012004275B2

(12) United States Patent
Lee et al.

(10) Patent No.: US 12,004,275 B2
(45) Date of Patent: Jun. 4, 2024

(54) CONTROLLING LIGHT EMITTING DIODES FOR SWITCHING PATTERNS

(71) Applicant: Infineon Technologies AG, Neubiberg (DE)

(72) Inventors: Sang Min Lee, Seoul (KR); Michael Schrodi, Seoul (KR); Davide Ghedin, Fiesso d'artico (IT); Fausto Borghetti, Sant'Ambrogiodi Valpolicella (IT); Alberto Trentin, Telve di Sopra (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/645,282

(22) Filed: Dec. 20, 2021

(65) Prior Publication Data

US 2023/0199928 A1 Jun. 22, 2023

(51) Int. Cl.
*H05B 45/3725* (2020.01)
*H05B 45/00* (2022.01)
*H05B 45/37* (2020.01)

(52) U.S. Cl.
CPC .................................... *H05B 45/37* (2020.01)

(58) Field of Classification Search
CPC ...................................................... H05B 45/37
See application file for complete search history.

(56) References Cited

U.S. PATENT DOCUMENTS

| | | | | |
|---|---|---|---|---|
| 9,578,724 | B1 * | 2/2017 | Knapp | H05B 45/375 |
| 2013/0049599 | A1 * | 2/2013 | Logiudice | H05B 47/24 315/122 |
| 2014/0361696 | A1 * | 12/2014 | Siessegger | H05B 45/395 315/193 |
| 2018/0098393 | A1 * | 4/2018 | Matsumoto | B60Q 1/1415 |
| 2020/0323057 | A1 * | 10/2020 | Adams | H05B 47/185 |

FOREIGN PATENT DOCUMENTS

WO WO-2013110052 A1 * 7/2013 ........... H01L 25/167

* cited by examiner

*Primary Examiner* — Minh D A
(74) *Attorney, Agent, or Firm* — Shumaker & Sieffert, P.A.

(57) ABSTRACT

A device is configured to determine a switching pattern comprising a first time range for activating a first plurality of light emitting diodes (LEDs) of a LED module and a second time range for activating a second plurality of LEDs of the LED module. The first plurality of LEDs and the second plurality of LEDs are different. The device is further configured to determine, for each LED of the first plurality of LEDs, a respective timeslot of a plurality of timeslots of the first time range. The device is further configured to output an instruction to a switching device to cause the switching device to couple each LED of the first plurality of LEDs to a supply during the respective timeslot determined for the LED.

18 Claims, 4 Drawing Sheets

CONTROLLING LIGHT EMITTING DIODES FOR SWITCHING PATTERNS

TECHNICAL FIELD

This disclosure relates to a controller device for one or more light emitting diodes.

BACKGROUND

Drivers may control a voltage, current, or power at a load. For instance, a light emitting diode (LED) driver may control a power supplied to a string of light emitting diodes. Some drivers may include a DC to DC converter, such as a buck-boost, buck, boost, or another DC to DC converter. Such DC to DC converters may change the power at the load based on a characteristic of the load. For instance, when operating front lighting of an automobile in a high beam setting, the string of light emitting diodes may require a higher power than when operating in a low beam setting.

SUMMARY

In general, this disclosure is directed to techniques for controlling switching of light emitting diodes (LEDs) for a switching pattern (e.g., a welcome light function or another switching pattern for another type of light function or lighting effect). For an example dynamic welcome light function, a first plurality of LEDs of a position lamp (e.g., a daytime running lamp or “DRL”) is turned on and then a second plurality of LEDs of the position lamp is turned on. Changing from the first plurality of LEDs (e.g., 2 LEDs) to a second plurality of LEDs (e.g., 4 LEDs) may result in a change in a voltage to be output by a supply (e.g., DC-DC converter). However, the supply may not be configured to change (e.g., increase or decrease) the voltage supplied before the controller switches the second plurality of LEDs on, which may result in undesirable flickering.

To help to account for the change in a number of LEDs turned on, the controller may determine, for each LED, a respective timeslot. For example, rather than simultaneously turning on 4 LEDs for a 500 μs duration of a 5 ms time range, the controller device may turn on only a first LED during a first 500 μs timeslot, then turn on only a second LED during a second 500 μs timeslot that is after the first 500 μs timeslot, then turn on only a third LED during a third 500 μs timeslot that is after the second 500 μs timeslot, and turn on only a fourth LED during a fourth 500 μs timeslot that is after the third 500 μs timeslot. In this way, an output voltage supplied by the supply may be constant during each sequence of a switching pattern (e.g., a welcome light function or another switching pattern for another type of light function or lighting effect), which may reduce or eliminate undesirable flickering.

In some examples, a device is configured to determine a switching pattern comprising a first time range for activating a first plurality of LEDs of a LED module and a second time range for activating a second plurality of LEDs of the LED module. The first plurality of LEDs and the second plurality of LEDs are different. The device is further configured to determine, for each LED of the first plurality of LEDs, a respective timeslot of a plurality of timeslots of the first time range. The device is further configured to output an instruction to a switching device to cause the switching device to couple each LED of the first plurality of LEDs to a supply during the respective timeslot determined for the LED.

In some examples, a method includes determining a switching pattern comprising a first time range for activating a first plurality of LEDs of a LED module and a second time range for activating a second plurality of LEDs of the LED module. The first plurality of LEDs and the second plurality of LEDs are different. The method further includes determining, for each LED of the first plurality of LEDs, a respective timeslot of a plurality of timeslots of the first time range. The method further includes outputting an instruction to a switching device to cause the switching device to couple each LED of the first plurality of LEDs to a supply during the respective timeslot determined for the LED.

In some examples, a system includes a LED module, a switching module configured to couple each LED of the LED module to a supply, and a controller device. The controller device is configured to determine a switching pattern comprising a first time range for activating a first plurality of LEDs of the LED module and a second time range for activating a second plurality of LEDs of the LED module. The first plurality of LEDs and the second plurality of LEDs are different. The controller device is further configured to determine, for each LED of the first plurality of LEDs, a respective timeslot of a plurality of timeslots of the first time range. The controller device is further configured to output an instruction to a switching device to cause the switching device to couple each LED of the first plurality of LEDs to the supply during the respective timeslot determined for the LED.

Details of these and other examples are set forth in the accompanying drawings and the description below. Other features, objects, and advantages will be apparent from the description and drawings, and from the claims.

DETAILED DESCRIPTION

Figure 1:
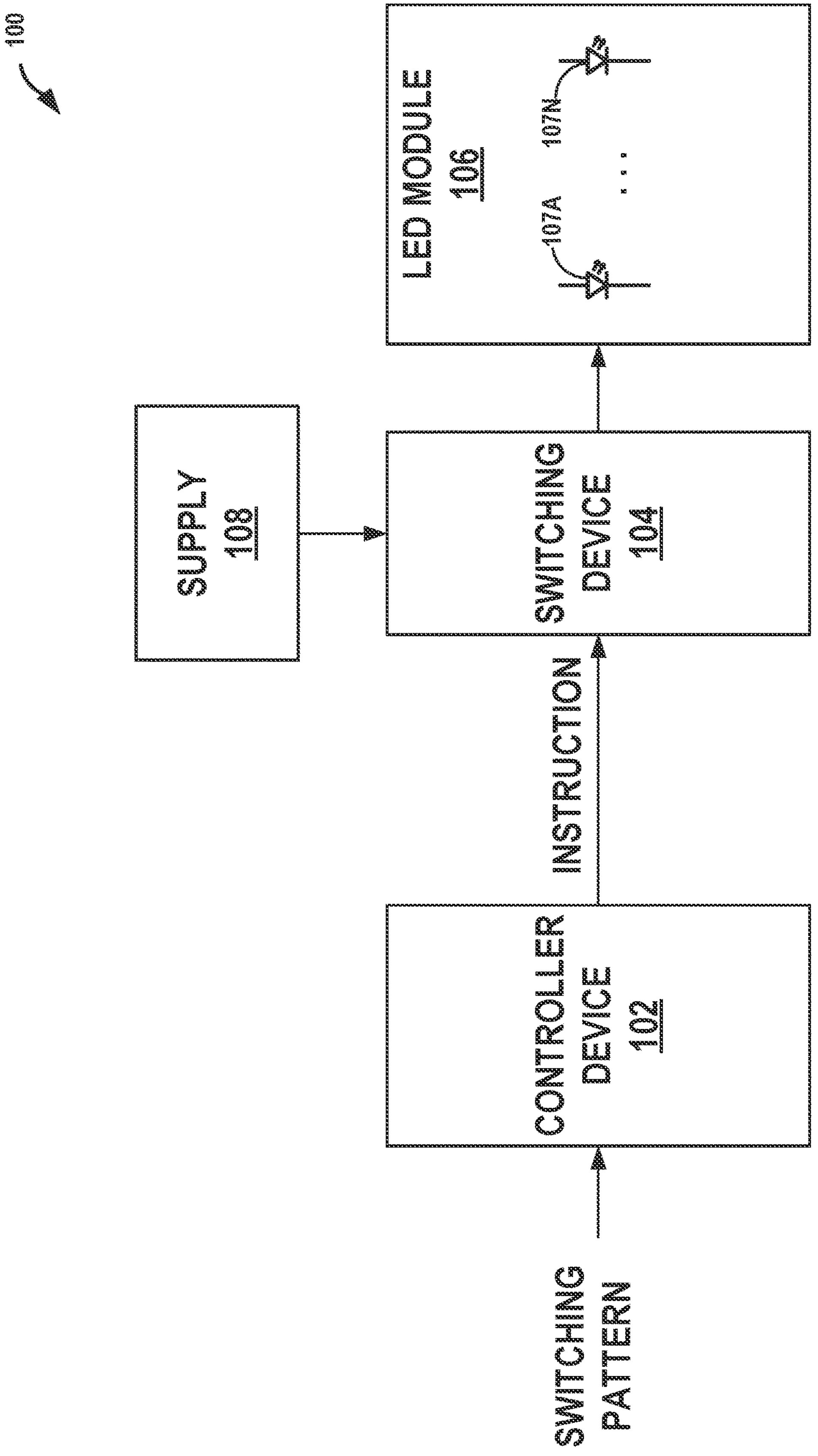
FIG. 1 is a block diagram illustrating an example system configured to determine a respective timeslot for each light emitting diode (LED), in accordance with one or more techniques of this disclosure.

This disclosure describes a controller device configured to control light emitting diodes (LEDs) in order to achieve a switching pattern. The following refers to a dynamic welcome light function in a front light of an automobile as a switching pattern for example purposes only. For an example dynamic welcome light function, each sector (e.g., group of LEDs) of a daytime running lamp (DRL) is sequentially turned on with position lighting and off. In some examples, the DRL lighting and position lighting use a same LED (e.g., the DRL). For instance, the DRL lighting may be run with the DRL (e.g., a set of LEDs) set to 100% brightness and the position lighting may be run with the same DRL set to a dimming brightness (e.g., 10% of the DRL lighting) by using a dimming switch. The dimming switch may be a switching element switched at a the dimming duty cycle. In this example, position LEDs (e.g., LEDs of the DRL that are dimmed by a dimming switch) may be turned on or off by bypass switches, which may be, for example, a matrix manager. In this way, the bypass switches can individually control LEDs of the DRL.

To help to achieve a dynamic welcome light function in a front light of an automobile, some techniques control bypass switches (e.g., a matrix manager) on top of position lighting. As noted above, the position lighting may be dimmed down, for example, with a 10% duty cycle from DRL lighting using a dimming switch. However, when the controller device controls the bypass switches to turn on more LEDs before a next on duty cycle time (e.g., 450 μs) of the supply (e.g., a DC-DC converter), the supply may not be able to generate an output voltage for the additional LEDs quickly enough to reach a stable target voltage.

For example, with a duty-cycle for position lighting being 10% of DRL full light, an LED may be on for approximately 500 μs. In this example, a first sequence of a welcome light function indicates to control the bypass switch to bypass a first LED and a second LED and to refrain from bypassing a third LED and a fourth LED. In this example, a second sequence of the welcome light function indicates to control the bypass switch to bypass the first LED, the second LED, the third LED, and the fourth LED, which turns on the first LED, the second LED, the third LED, and the fourth LED. As such, the supply may increase an output voltage from a stable 6 volt (V) voltage for 2 LEDs to provide a stable 12 V voltage for 4 LEDs. However, the supply may only be outputting an 9 V unstable voltage for 4 LEDs when the bypass switch changes to the second sequence, which may result in LED current and brightness being changed due to the output voltage supplied by the power converter not reaching the stable target voltage (e.g., 12 V). Not reaching the stable target voltage may result in the undesirable flickering of the LEDs.

In accordance with the techniques of the disclosure, the controller device may apply a "time-sharing approach," where the controller device may control bypass switches to work (e.g., turn on a respective LED) in a different timeslot. In this way, although additional LEDs are turned on in a sequence in a switching pattern, the supply may be configured to generate an output voltage that can remain as a stable constant voltage for each sequence of the switching pattern. As such, a supply with a relatively slow bandwidth compared to changes in each sequence of the switching pattern may provide a stable current voltage for a switching pattern that varies a number of LEDs turned on, such as for a welcome light function performed by on DRLs of an automobile or another type of light function or effect for a set of LEDs. While examples described herein refer to a DRL as an example LED module, techniques described herein for controlling LEDs may use other types of LED modules such as, for example, a tail lamp of an automobile, an interior light of an automobile, other types of automobile lighting, or other types of lighting.

Moreover, in some examples, the controller device may turn on the supply with a 100% duty cycle while the bypass switches work in a different timeslot with a dimming duty cycle (e.g., a 10% duty cycle). In this way, the bypass switches may perform dimming for position lighting using a DRL, which may allow the bypass switch of a supply configured to perform the dimming for position lighting to be omitted, thereby potentially reducing a cost of the supply.

FIG. 1 is a block diagram illustrating an example system 100 configured to determine a respective timeslot for each light emitting diode (LED) of LEDs 107A-107N (collectively, "LEDs 107"), in accordance with one or more techniques of this disclosure. System 100 includes a controller device 102, a switching device 104, an LED module 106, and a supply 108.

Controller device 102 may be configured to receive a switching pattern (e.g., a welcome light function or another switching pattern for another type of light function or lighting effect) and output an instruction to control switching device 104 to cause switching device 104 to couple each LED of a first plurality of LEDs 107 to supply 108 during the respective timeslot determined for the LED. Controller device 102 may include an analog circuit. In some examples, controller device 102 may be a microcontroller on a single integrated circuit containing a processor core, memory, inputs, and outputs. For example, controller device 102 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller device 102 may be a combination of one or more analog components and one or more digital components.

Switching device 104 may be configured to independently couple (e.g., electrically couple) each LED of LEDs 107 to supply 108 based on the instruction output by controller device 102. For example, switching device 104 may include, for each LED of LEDs 107, a bypass switch electrically coupled to across a respective LED of the LEDs 107. Switching device 104 may control each bypass switch to turn on or turn off based on the instruction. When the bypass switch is on (e.g., switched-in), current from supply 108 flows through the bypass switch instead of the respective LED of LEDs 107. However, when the bypass switch is off (e.g., switched-out) current from supply 108 flows through the respective LED of LEDs 107. The bypass switch may include a switching element. Examples of switching elements may include, but are not limited to, a silicon-controlled rectifier (SCR), a Field Effect Transistor (FET), and a bipolar junction transistor (BJT). Examples of FETs may include, but are not limited to, a junction field-effect transistor (JFET), a metal-oxide-semiconductor FET (MOSFET), a dual-gate MOSFET, an insulated-gate bipolar transistor (IGBT), any other type of FET, or any combination of the same.

Supply 108 may be configured to output a supply power for driving LEDs 107 of LED module 106. In some examples, supply 108 may include a DC to DC converter. In some examples, supply 108 may be configured to generate an output voltage based on an indication of a target voltage. For instance, supply 108 may be configured to generate the output voltage based on a number of LEDs to be driven. Supply 108 may include one or more switch-mode power converters including, but are not limited to, flyback, buck-boost, buck, or Ćuk.

LED module 106 may include any number of LEDs. While FIG. 1 illustrates LED module 106 as separate from switching device 104, in some examples, LED module 106 may be part of switching device 104. In some examples, two or more LEDs of LEDs 107 may be coupled in series. Additionally, or alternatively, two or more LEDs of LEDs 107 may be coupled in parallel. LEDs 107 may refer to any suitable semiconductor light source. In some examples, LEDs 107 include a p-n junction configured to emit light when activated. LEDs 107 may be included in a headlight assembly for automotive applications. For instance, LEDs 107 may be a matrix of light emitting diodes to light a road ahead of a vehicle. As used herein, a vehicle may refer to trucks, boats, golf carts, snowmobiles, heavy machines, or any type of vehicle that uses directional lighting. In some examples, LEDs 107 may be associated with one or more operational modes. For example, LEDs 107 may be configured to operate at a requested switching pattern corresponding to DRL lighting or corresponding to position lighting. Position lighting may be dimmed from DRL lighting. For instance, position lighting may be dimmed to less than 20% or less than 10% of the DRL lighting. A mode of LEDs 107 may be controlled, for example, by controller device 102, for adaptive functionality. For instance, in the automotive example, controller device 102 may output the instruction to cause LEDs 107 to output a welcome light function.

In accordance with the techniques of the disclosure, controller device 102 may apply a time-sharing approach. For example, controller device 102 may control switching device 104 to turn on a respective LED of LEDs 107 in a different timeslot than other LEDs of LEDs 107. For example, rather than turning on N number LEDs of LEDs 107, where N is a positive integer, during a single timeslot (e.g., a 500 μs range) of a time range (e.g., a 5 ms time range) of switching pattern, controller device 102 may control switching device 104 to turn on each LED of the N number of LEDs in a different timeslot. In this way, although additional or fewer LEDs are turned on in a sequence of a switching pattern, supply 108 (e.g., a DC-DC converter) may be configured to generate an output voltage that can remain as a stable constant voltage for each sequence of the switching pattern.

For example, controller device 102 may determine a switching pattern includes a first time range for activating a first plurality of light emitting diodes of a LED module 106 and a second time range for activating a second plurality of LEDs of LED module 106. In this example, the first plurality of LEDs and the second plurality of LEDs may be different. Controller device 102 may determine, for each LED of the first plurality of LEDs, a respective timeslot of a plurality of timeslots of the first time range. Controller device 102 may output an instruction to switching device 104 to cause switching device 104 to couple (e.g., electrically couple) each LED of the first plurality of LEDs to supply 108 during the respective timeslot determined for the LED.

Figures 2A, 2B:
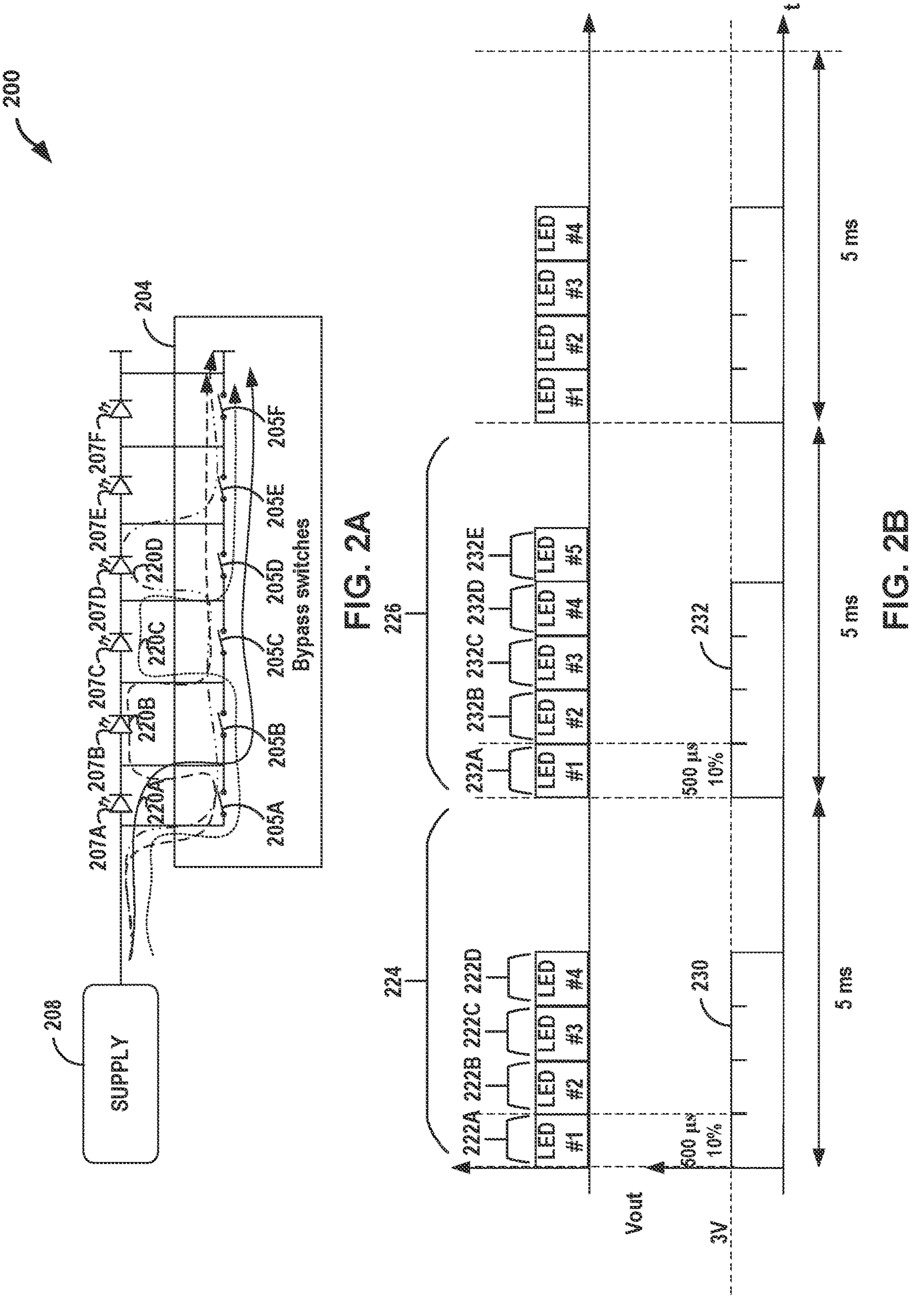
FIG. 2A is a conceptual diagram illustrating an example switching device coupling each LED to a supply during a respective timeslot, in accordance with one or more techniques of this disclosure.
FIG. 2B is a conceptual diagram illustrating a respective timeslot for each LED, in accordance with one or more techniques of this disclosure.

FIG. 2A is a conceptual diagram illustrating an example switching device 204 coupling each LED of LEDs 207A-207F (collectively, "LEDs 207") to a supply 208 during a respective timeslot, in accordance with one or more techniques of this disclosure. FIG. 2A is discussed with FIG. 1 for example purposes only.

In the example of FIG. 2A, system 200 is overcurrent protected, current supplied by supply 208 is 1 Amp, a number of LEDs is 10 (e.g., only 6 are shown in FIG. 2A), the LED forward voltage (Vf) is 3.5 V, the duty cycle is 10%, the switching frequency of supply 208 is 420 kHz, and the switching device frequency (e.g., matrix manager frequency) is 200 Hz. In this example, an output of supply 208 is not dimmed with 10% duty-cycle. That is, the output of supply 208 is turned on without a dimming switch. Instead, each bypass switch of switching device 204 is turned on and off repeatedly with a dimming duty cycle (e.g., a 10% duty-cycle). FIG. 2A is discussed further with respect to FIG. 2B.

FIG. 2B is a conceptual diagram illustrating a respective timeslot for each LED, in accordance with one or more techniques of this disclosure. FIG. 2B is discussed with FIGS. 1 and 2A for example purposes only. Controller device 102 may generate an instruction to cause switching device 204 to turn on LED 207A during a first time range 224 for a first sequence of a switching pattern. In this example, controller device 102 may output the instruction to turn off bypass switch 205A during timeslot 222A with a dimming duty cycle (e.g., a 10% duty-cycle) to provide current 220A to LED 207A. That is, turning off bypass switch 205A may cause LED 207A to couple to supply 208. In this example, bypass switches 205B-205F are turned on during timeslot 222A.

In the example of FIGS. 2A, 2B, controller device 102 may generate the instruction to cause switching device 204 to turn on LED 207B during a first time range 224 for a first sequence of a switching pattern. In this example, controller device 102 may output the instruction to turn off bypass switch 205A during timeslot 222B with a dimming duty cycle (e.g., a 10% duty-cycle) to provide current 220B to LED 207B. In this example, bypass switches 205A, 205C-205F are turned on during timeslot 222B. Even though LED 207B is on during timeslot 222B, the voltage (Vout) output by supply 208 (e.g., a DC-DC converter) may remain constant throughout timeslots 222A-222D and/or time range 224. In this way, supply 208 may provide a stable output voltage to help to maintain a color of LEDs 207 and/or a brightness of LEDs 207 and/or to help to reduce or eliminate undesirable flicker of LEDs 207. Moreover, supply 208 may not be configured to provide a dimming duty cycle for position lighting and or a switching pattern (e.g., a welcome light function or another switching pattern for another type of light function or lighting effect), which may eliminate a bypass switch from supply 208.

Similarly, controller device 102 may output the instruction to turn off bypass switch 205C during timeslot 222C with a dimming duty cycle (e.g., a 10% duty-cycle) to provide current 220C to LED 207C and to turn off bypass switch 205D during timeslot 222D with a dimming duty cycle to provide current 220D to LED 207D. In this example, bypass switches 205A-205B, 205D-205F are turned on during timeslot 222C and bypass switches 205A-205C, 205E-205F are turned on during timeslot 222D. As shown, each timeslot of timeslots 222A-222D of first time range 224 may be equal to a time duration (e.g., 500 μs).

In the example of FIGS. 2A, 2B, timeslot 222A for LED 207A is different from timeslots 222B-222D. For instance, timeslot 222A does not overlap with any of timeslots 222B-222D. Controller device 102 may generate an instruction to cause supply 108 to activate no more than one LED of LEDs 207 during each timeslot of timeslots 222A-222D of first time range 224. For example, in this example, supply 208 may provide current for only one LED for each of timeslots 222A-222D. In some examples, however, supply 208 may provide current for more than one LED for one or more timeslots. For instance, supply 208 may provide current for M number of LEDs for timeslots 222A-222D, where M is a positive integer greater than 1.

Supply 208 may be configured to output a stable voltage during first time range 224 and during second time range 226. For example, supply 208 may be configured to output a first voltage 230 (e.g., 3 V) during first time range 224 that corresponds to (e.g., matches or is equal to) a second voltage 232 (e.g., 3 V) during second time range 226. In this way, although additional or fewer LEDs are turned on in a sequence in a switching pattern, supply 208 may be configured to generate an output voltage that can remain as a stable constant voltage for each sequence of the switching pattern.

Each sequence of the switching pattern may turn on a number of LEDs independent of LEDs turned on in other sequences of the switching pattern. For example, controller device 102 may generate an instruction to cause switching device 204 to turn on a first plurality of LEDs (e.g., 4 LEDS) of LEDs 207 during first time range 224 and to turn on a second plurality of LEDs (e.g., 5 LEDS) of LED 207 during second time range 226. As shown, first time range 224 may be equal to second time range 226. However, in some examples, the first time range may not be equal to the second time range.

In some examples, the first plurality of LEDs and the second plurality of LEDs may be equal. However, in some examples, the first plurality of LEDs may include a first number of LEDs that is different from a second number of LEDs of the second plurality of LEDs. For instance, in the example of FIG. 2A, 2B, the first plurality of LEDs is 4 and the second plurality of LEDs is 5. The switching pattern may indicate the first plurality of LEDs for a first sequence of a welcome light function and the second plurality of LEDs for a second sequence of the welcome light function. While this example refers to a welcome light function, techniques may be applied to another switching pattern for another type of light function or lighting effect.

For example, controller device 102 may determine, for each LED of the second plurality of LEDs (e.g., LEDs 207A-207E), a respective timeslot of timeslots 232A-232E of second time range 226. In this example, controller device 102 may output a second instruction to switching device 204 to cause switching device 204 to couple each LED of the second plurality of LEDs to supply 208 during the respective timeslot determined for the LED of the second plurality of LEDs. For instance, switching device 204 may electrically couple LED 207A to supply 208 during timeslot 232A, LED 207B to supply 208 during timeslot 232B, LED 207C to supply 208 during timeslot 232C, LED 207D to supply 208 during timeslot 232D, and LED 207E to supply 208 during timeslot 232E.

Figure 3:
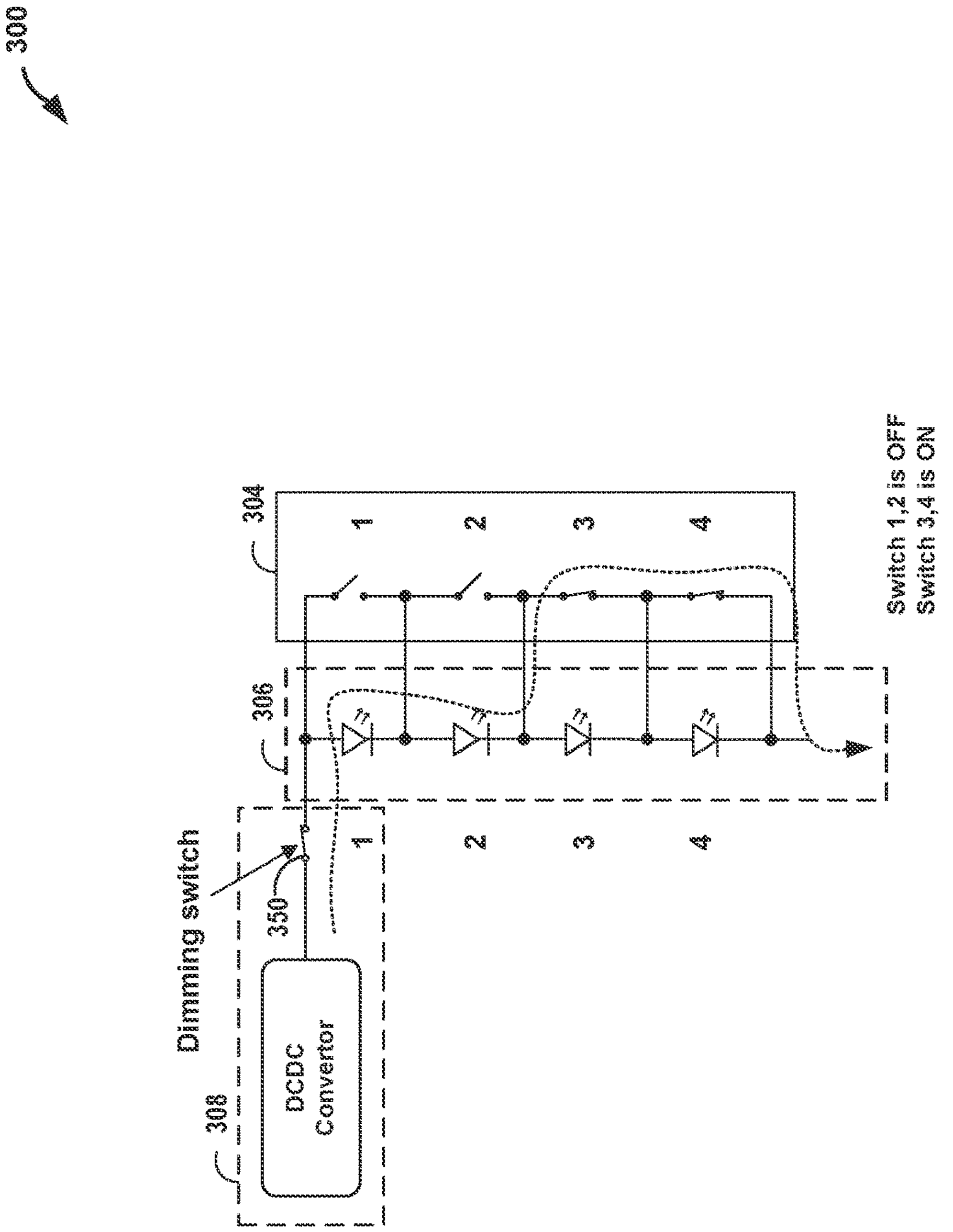
FIG. 3 is a conceptual diagram illustrating an example supply, in accordance with one or more techniques of this disclosure.

FIG. 3 is a conceptual diagram illustrating an example supply 308, in accordance with one or more techniques of this disclosure. FIG. 3 is discussed with FIGS. 1, 2A, 2B for example purposes only. In this example, supply 308 includes a dimming switch 350 configured to receive a first voltage signal output by supply 208 and output a second voltage signal to the switching device that has a different duty cycle than the first voltage signal. For example, dimming switch 350 may be turned on and off repeatedly with a dimming duty cycle (e.g., a 10% duty-cycle) when system 300 is operating switching module 304 and LED module 306 for position lighting and/or for a welcome light function. In this way, each bypass switch of switching module 304 may be turned on for an entire portion of a timeslot instead of being repeatedly turned-on and turned-off with a dimming duty cycle.

Figure 4:
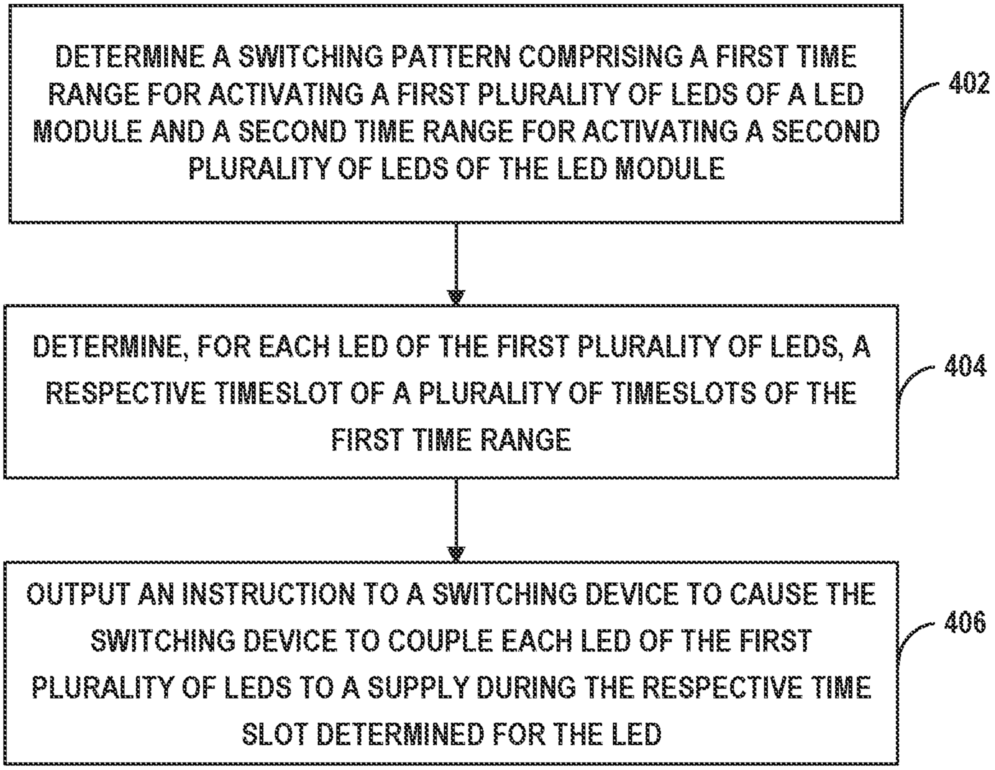
FIG. 4 is a flow diagram consistent with techniques that may be performed by the example system of FIG. 1, in accordance with this disclosure.

FIG. 4 is a flow diagram consistent with techniques that may be performed by the example system of FIG. 1, in accordance with this disclosure. FIG. 4 is discussed with FIGS. 1-3 for example purposes only. Controller device 102 may determine a switching pattern comprising a first time range for activating a first plurality of LEDs of LED module 106 and a second time range for activating a second plurality of LEDs of LED module 106 (402). The first plurality of LEDs and the second plurality of LEDs may be different. For example, a first sequence of a welcome light function may turn on N number of LEDs and a second light sequence of the welcome light function may turn on M number of LEDs, where N and M are positive integers.

Controller device 102 may determine, for each LED of the first plurality of LEDs, a respective timeslot of a plurality of timeslots of the first time range (404). For example, controller device 102 may determine timeslot 222A for LED 207A, timeslot 222B for LED 207B, timeslot 222C for LED 207C, and timeslot 222D for LED 207D.

Controller device 102 may output an instruction to switching device 104 to cause switching device 104 to couple each LED of the first plurality of LEDs to supply 108 during the respective timeslot determined for the LED (406). For example, the instruction may cause switching device 204 to electrically couple LED 207A to supply 208 during timeslot 222A, LED 207B to supply 208 during timeslot 222B, LED 207C to supply 208 during timeslot 222C, and LED 207D to supply 208 during timeslot 222D. In some examples, controller device 102 may be configured to generate the instruction to cause supply 108 to activate no more than one LED of the first plurality of LEDs during each timeslot of the plurality of timeslots of the first time range. For instance, controller device 102 may be configured to generate the instruction to cause supply 108 to supply a voltage for activating one LED (e.g., 3 V) during each of timeslots 222A-222D of first time range 224.

The following clauses may illustrate one or more aspects of the disclosure.

Clause 1. A device configured to: determine a switching pattern comprising a first time range for activating a first plurality of light emitting diodes (LEDs) of a LED module and a second time range for activating a second plurality of LEDs of the LED module, wherein the first plurality of LEDs and the second plurality of LEDs are different; determine, for each LED of the first plurality of LEDs, a respective timeslot of a plurality of timeslots of the first time range; and output an instruction to a switching device to cause the switching device to couple each LED of the first plurality of LEDs to a supply during the respective timeslot determined for the LED.

Clause 2. The device of clause 1, wherein the respective timeslot for a first LED of the first plurality of LEDs is different from the respective timeslot for each other LED of the first plurality of LEDs.

Clause 3. The device of clauses 1-2, wherein the device is further configured to generate the instruction to cause the supply to activate no more than one LED of the first plurality of LEDs during each timeslot of the plurality of timeslots of the first time range.

Clause 4. The device of any of clauses 1-3, wherein the device is further configured to determine, for each LED of the second plurality of LEDs, a respective timeslot of a plurality of timeslots of the second time range; and output a second instruction to the switching device to cause the switching device to couple each LED of the second plurality of LEDs to the supply during the respective timeslot determined for the LED of the second plurality of LEDs.

Clause 5. The device of any of clauses 1-4, wherein the switching pattern indicates the first plurality of LEDs for a first sequence of a welcome light function and the second plurality of LEDs for a second sequence of the welcome light function.

Clause 6. The device of any of clauses 1-5, wherein the supply comprises a DC to DC converter.

Clause 7. The device of clause 6, wherein the supply comprises a dimming switch configured to receive a first voltage signal output by the DC to DC converter and output a second voltage signal to the switching device that has a different duty cycle than the first voltage signal.

Clause 8. The device of any of clauses 1-7, wherein each timeslot of the plurality of timeslots of the first time range is equal to a time duration.

Clause 9. The device of any of clauses 1-8, wherein the first time range is equal to the second time range.

Clause 10. The device of any of clauses 1-9, wherein the first plurality of LEDs comprises a first number of LEDs that is different from a second number of LEDs of the second plurality of LEDs.

Clause 11. A method comprising: determining a switching pattern comprising a first time range for activating a first plurality of light emitting diodes (LEDs) of a LED module and a second time range for activating a second plurality of LEDs of the LED module, wherein the first plurality of LEDs and the second plurality of LEDs are different; determining, for each LED of the first plurality of LEDs, a respective timeslot of a plurality of timeslots of the first time range; and outputting an instruction to a switching device to cause the switching device to couple each LED of the first plurality of LEDs to a supply during the respective timeslot determined for the LED.

Clause 12. The method of clause 11, wherein the respective timeslot for a first LED of the first plurality of LEDs is different from the respective timeslot for each other LED of the first plurality of LEDs.

Clause 13. The method of any of clauses 11-12, further comprising generating the instruction to cause the supply to activate no more than one LED of the first plurality of LEDs during each timeslot of the plurality of timeslots of the first time range.

Clause 14. The method of any of clauses 11-13, further comprising determining, for each LED of the second plurality of LEDs, a respective timeslot of a plurality of timeslots of the second time range; and outputting a second instruction to the switching device to cause the switching device to couple each LED of the second plurality of LEDs to the supply during the respective timeslot determined for the LED of the second plurality of LEDs.

Clause 15. The method of any of clauses 11-14, wherein the switching pattern indicates the first plurality of LEDs for a first sequence of a welcome light function and the second plurality of LEDs for a second sequence of the welcome light function.

Clause 16. The method of any of clauses 11-15, wherein each timeslot of the plurality of timeslots of the first time range is equal to a time duration.

Clause 17. A system comprising: a light emitting diode (LED) module; a switching module configured to couple each LED of the LED module to a supply; and a controller device configured to: determine a switching pattern comprising a first time range for activating a first plurality of LEDs of the LED module and a second time range for activating a second plurality of LEDs of the LED module, wherein the first plurality of LEDs and the second plurality of LEDs are different; determine, for each LED of the first plurality of LEDs, a respective timeslot of a plurality of timeslots of the first time range; and output an instruction to a switching device to cause the switching device to couple each LED of the first plurality of LEDs to the supply during the respective timeslot determined for the LED.

Clause 18. The system of clause 17, wherein the LED module comprises the switching module.

Clause 19. The system of any of clauses 17-18, further comprising the supply.

Clause 20. The system of any of clauses 17-19, wherein the supply is configured to output a first voltage during the first time range that corresponds to a second voltage during the second time range.

Various aspects have been described in this disclosure. These and other aspects are within the scope of the following claims.

The invention claimed is:

1. A device configured to:

determine a switching pattern indicating to activate a first plurality of light emitting diodes (LEDs) included in a string of LEDs of a LED module during a first time range and to activate a second plurality of LEDs included in the string of LEDs during a second time range, wherein the first plurality of LEDs comprises a first number of LEDs that is different from a second number of LEDs of the second plurality of LEDs;

determine, for each LED of the first plurality of LEDs included in the string of LEDs, a respective timeslot of a plurality of timeslots of the first time range;

determine, for each LED of the second plurality of LEDs included in the string of LEDs, a respective timeslot of a plurality of timeslots of the second time range, wherein each timeslot of the plurality of timeslots of both the first time range and the second time range is equal to a time duration;

output a first instruction to a switching device to cause the switching device to couple, during the first time range, each LED of the first plurality of LEDs in the string of LEDs to a supply during the respective timeslot determined for the LED of the first plurality of LEDs; and output a second instruction to the switching device to cause the switching device to couple, during the second time range, each LED of the second plurality of LEDs in the string of LEDs to the supply during the respective timeslot determined for the LED of the second plurality of LEDs, wherein the supply is configured to output a voltage or current to the string of LEDs that remains constant during both the first time range when the first instruction causes the switching device to couple each LED of the first plurality of LEDs included in the string of LEDs to the supply and the second time range when the second instruction causes the switching device to couple each LED of the second plurality of LEDs included in the string of LEDs to the supply.

2. The device of claim 1, wherein the respective timeslot for a first LED of the first plurality of LEDs is different from the respective timeslot for each other LED of the first plurality of LEDs.

3. The device of claim 1, wherein the device is further configured to generate the first instruction to cause the supply to activate no more than one LED of the first plurality of LEDs during each timeslot of the plurality of timeslots of the first time range.

4. The device of claim 1, wherein the switching pattern indicates the first plurality of LEDs for a first sequence of a welcome light function and the second plurality of LEDs for a second sequence of the welcome light function.

5. The device of claim 1, wherein the supply comprises a DC to DC converter.

6. The device of claim 5, wherein the supply comprises a dimming switch configured to receive a first voltage signal output by the DC to DC converter and output a second voltage signal to the switching device that has a different duty cycle than the first voltage signal.

7. The device of claim 1, wherein the first time range is equal to the second time range.

8. The device of claim 1, wherein the switching device comprises a first bypass switch arranged in parallel with a first LED of the string of LEDs and a second bypass switch arranged in parallel with a second LED of the string of LEDs and wherein to output the first instruction, the device is configured to:

control, during the respective timeslot for the first LED, the first bypass switch to turn on the first LED and the second bypass switch to refrain from turning on the second LED; and control, during the respective timeslot for the second LED, the second bypass switch to turn on the second LED and the first bypass switch to refrain from turning on the first LED.

9. A method comprising:

determining a switching pattern indicating to activate a first plurality of light emitting diodes (LEDs) included in a string of LEDs of a LED module during a first time range and to activate a second plurality of LEDs included in the string of LEDs during a second time range, wherein the first plurality of LEDs comprises a first number of LEDs that is different from a second number of LEDs of the second plurality of LEDs;

determining, for each LED of the first plurality of LEDs included in the string of LEDs, a respective timeslot of a plurality of timeslots of the first time range;

determining, for each LED of the second plurality of LEDs included in the string of LEDs, a respective timeslot of a plurality of timeslots of the second time range, wherein each timeslot of the plurality of timeslots of both the first time range and the second time range is equal to a time duration;

outputting a first instruction to a switching device to cause the switching device to couple, during the first time range, each LED of the first plurality of LEDs in the string of LEDs to a supply during the respective timeslot determined for the LED of the first plurality of LEDs; and outputting a second instruction to the switching device to cause the switching device to couple, during the second time range, each LED of the second plurality of LEDs in the string of LEDs to the supply during the respective timeslot determined for the LED of the second plurality of LEDs, wherein the supply is configured to output a voltage or current to the string of LEDs that remains constant during both the first time range when the first instruction causes the switching device to couple each LED of the first plurality of LEDs included in the string of LEDs to the supply and the second time range when the second instruction causes the switching device to couple each LED of the second plurality of LEDs included in the string of LEDs to the supply.

10. The method of claim 9, wherein the respective timeslot for a first LED of the first plurality of LEDs is different from the respective timeslot for each other LED of the first plurality of LEDs.

11. The method of claim 9, further comprising generating the first instruction to cause the supply to activate no more than one LED of the first plurality of LEDs during each timeslot of the plurality of timeslots of the first time range.

12. The method of claim 9, wherein the switching pattern indicates the first plurality of LEDs for a first sequence of a welcome light function and the second plurality of LEDs for a second sequence of the welcome light function.

13. The method of claim 9, wherein the switching device comprises a first bypass switch arranged in parallel with a first LED of the string of LEDs and a second bypass switch arranged in parallel with a second LED of the string of LEDs and wherein outputting the first instruction comprises:

controlling, during the respective timeslot for the first LED, the first bypass switch to turn on the first LED and the second bypass switch to refrain from turning on the second LED; and controlling, during the respective timeslot for the second LED, the second bypass switch to turn on the second LED and the first bypass switch to refrain from turning on the first LED.

14. A system comprising:

a light emitting diode (LED) module;

a switching device configured to couple each LED included in a string of LEDs of the LED module to a supply; and a controller device configured to:

determine a switching pattern indicating to activate a first plurality of LEDs included in the string of LEDs during a first time range and to activate a second plurality of LEDs included in the string of LEDs during a second time range, wherein the first plurality of LEDs comprises a first number of LEDs that is different from a second number of LEDs of the second plurality of LEDs;

determine, for each LED of the first plurality of LEDs included in the string of LEDs, a respective timeslot of a plurality of timeslots of the first time range;

determine, for each LED of the second plurality of LEDs included in the string of LEDs, a respective timeslot of a plurality of timeslots of the second time range, wherein each timeslot of the plurality of timeslots of both the first time range and the second time range is equal to a time duration;

output a first instruction to the switching device to cause the switching device to couple, during the first time range, each LED of the first plurality of LEDs in the string of LEDs to the supply during the respective timeslot determined for the LED of the first plurality of LEDs, and output a second instruction to the switching device to cause the switching device to couple, during the second time range, each LED of the second plurality of LEDs in the string of LEDs to the supply during the respective timeslot determined for the LED of the second plurality of LEDs, wherein the supply is configured to output a voltage or current to the string of LEDs that remains constant during both the first time range when the first instruction causes the switching device to couple each LED of the first plurality of LEDs included in the string of LEDs to the supply and the second time range when the second instruction causes the switching device to couple each LED of the second plurality of LEDs included in the string of LEDs to the supply.

15. The system of claim 14, wherein the LED module comprises the switching device.

16. The system of claim 14, further comprising the supply.

17. The system of claim 16, wherein the supply is configured to output a first voltage during the first time range that corresponds to a second voltage during the second time range.

18. The system of claim 14, wherein the switching device comprises a first bypass switch arranged in parallel with a first LED of the string of LEDs and a second bypass switch arranged in parallel with a second LED of the string of LEDs and wherein to output the first instruction, the controller device is configured to:

control, during the respective timeslot for the first LED, the first bypass switch to turn on the first LED and the second bypass switch to refrain from turning on the second LED; and control, during the respective timeslot for the second LED, the second bypass switch to turn on the second LED and the first bypass switch to refrain from turning on the first LED.

* * * * *